(12) United States Patent
Thacher

(10) Patent No.: US 7,752,302 B2
(45) Date of Patent: Jul. 6, 2010

(54) AUTONOMOUS AND DEPENDENT DATA COLLECTION FOR TRAFFIC ANALYSIS

(75) Inventor: Jeffery W. Thacher, Roswell, GA (US)

(73) Assignee: Discrete Wireless, Atlanta, GA (US)

( * ) Notice: Subject to any disclaimer, the term of this patent is extended or adjusted under 35 U.S.C. 154(b) by 620 days.

(21) Appl. No.: 11/308,365

(22) Filed: Mar. 19, 2006

(65) Prior Publication Data
US 2007/0130248 A1 Jun. 7, 2007

Related U.S. Application Data

(63) Continuation-in-part of application No. 11/164,679, filed on Dec. 1, 2005.

(51) Int. Cl.
*G06F 15/16* (2006.01)
(52) U.S. Cl. ...................................... 709/224
(58) Field of Classification Search ................ 709/202, 709/224; 701/200
See application file for complete search history.

(56) References Cited

U.S. PATENT DOCUMENTS

| | | | | |
|---|---|---|---|---|
| 6,075,769 A * | 6/2000 | Ghanwani et al. | ........... | 370/229 |
| 6,314,368 B1 * | 11/2001 | Gurmu et al. | ............... | 701/209 |
| 6,542,808 B2 * | 4/2003 | Mintz | .......................... | 701/117 |
| 6,711,495 B1 * | 3/2004 | Ukai et al. | ................... | 701/207 |
| 7,246,007 B2 * | 7/2007 | Ferman | ....................... | 701/200 |
| 2006/0064234 A1 * | 3/2006 | Kumagai et al. | ............ | 701/117 |
| 2007/0100537 A1 * | 5/2007 | Parikh et al. | ................ | 701/117 |
| 2007/0126604 A1 * | 6/2007 | Thacher | ................. | 340/995.13 |
| 2008/0270519 A1 * | 10/2008 | Ekdahl et al. | ............... | 709/203 |

* cited by examiner

*Primary Examiner*—Wing F Chan
*Assistant Examiner*—Tesfay Yohannes
(74) *Attorney, Agent, or Firm*—Gregory Scott Smith

(57) ABSTRACT

A central control system operates in conjunction with multiple mobile traffic probes to analyze and characterize traffic in a particular region or area. The traffic probes operate autonomously to collect traffic related data and report the collected data to the central control system. The traffic probes can analyze the collected data to identify traffic anomalies, and in response, change the amount and type of data collected, as well as the frequency of reporting the data to the central control system. In addition, the central control system can analyze the received data to identify traffic anomalies or points of interest and force one or more deployed traffic probes to change the amount and type of data collected, as well as the frequency of reporting.

20 Claims, 5 Drawing Sheets

AUTONOMOUS AND DEPENDENT DATA COLLECTION FOR TRAFFIC ANALYSIS

CROSS-REFERENCE TO RELATED APPLICATIONS

The present invention is a continuation-in-part of United States application for patent filed on Dec. 1, 2005 with a title of "GEO-FENCE LOCATION-SPECIFIC EQUIPMENT STATUS BASED TRIGGER DIRECTED CONTENT DELIVERY" and assigned Ser. No. 11/164,679.

This application is related to the following United States patent applications which were filed concurrently herewith and are incorporated herein by reference in their entirety:

Ser. No. 11/308,364 filed on Mar. 19, 2006 with a title of MAPS, ROUTES AND SCHEDULE GENERATION BASED ON HISTORICAL AND REAL-TIME DATA, and Ser. No. 11/308,367 filed on Mar. 19, 2006 with a title of IN-VEHICLE CONDITIONAL MULTI-MEDIA CENTER.

BACKGROUND OF THE INVENTION

This invention relates to the fields of location devices and systems, and distributed geocentric location based systems and their application to the collection of traffic related information and, more particularly to utilizing mobile and/or stationary probes for autonomous and controlled or dependent data collection of real-time traffic conditions.

If you average 8 hours of sleep each night, you spend a third of your life sleeping. When you couple that with working 8 hours a day, 5 days a week, there goes about another 24 percent of your life. Thus, roughly speaking, you may be spending 57% of your life either sleeping or working. That leaves a mere 43% of your life for doing everything else. When you take into account the time you spend paying bills, mowing the lawn, taking out the garbage, cleaning your home, unloading the dishwasher and raking leaves, it makes you wonder just how much is left over for the important things. And although the realization of this small remainder of time that we each have does not justify road rage, the existence of road rage is certainly much more understandable.

For most people, the amount of time we spend stuck in traffic is an ever increasing plague. Assuming that the 43% of your life that is not spent sleeping or working is reduced by another 10% performing the above-listed tasks and other not so fun tasks, this leave you with 33% of your life—or an average of 7.92 hours per day. Ouch. All of the sudden, that one-hour one-way commute looks even less tolerable. No wonder the garbage never gets taken out.

But this dilemma is not a secret. The world is quite aware of not only the time consumed in traffic, but also the other ill affects, such as wasted fuel and pollution. That is why in most larger cities, you see helicopters buzzing overhead during rush hours and cameras lined up along the highways. Most cities even have individuals that have launched careers that focuses on delivering traffic reports over the radio and television air waves. However, here is the typical manner of how life unfolds. Moments after you pass the last exit that can provide you with an escape route, the "every six minute" traffic report blasts through the radio informing you that a tractor trailer has just plowed through 4 lanes of traffic and has spilled its load on the highway and that traffic is going to be a nightmare. Seconds later you see the brake lights illuminate the unending path that lies before you. You look in the rearview mirror to see all those fortunate souls that are peeling off onto the exit ramp as other cars pile in behind you, solidifying your fate. And the clock keeps ticking.

Technology advances have been incredibly useful in the navigational world. Many people have the luxury of colored screens and soft voices speaking to them as they travel, informing the driver of the next turn to take on their road trip. However, such technology does not inform the driver of the tractor trailer incident that has just occurred and then instruct the driver to take alternate routes.

Furthermore, the "eye in the sky" chopper pilots, working in cooperation with the fixed location cameras and "call in lay-traffic reporters" are able to gather some information regarding traffic problems, but with all the conglomeration of the available technology, we still find ourselves stuck in traffic, looking for an escape and wondering how much longer before I can be moving again. What is needed in the art is a technique to more reliably gather traffic related information, analyze the gathered information and deliver the results in a timely manner to drivers. Furthermore, what is needed in the art is a technique to identify "hot spots" and then focus on gathering a heightened amount of information pertaining to the characteristics of the host spot.

BRIEF SUMMARY OF THE INVENTION

The present invention addresses the above-identified needs in the art, as well as other needs in the art through providing a system and method for gathering traffic related data at a central control system from a plurality of deployed mobile traffic probes. One aspect of the present invention includes mobile traffic probes that can autonomously control the amount and type of data collected as well as the rate of reporting the collected data to the central control system. The traffic probes are able to gather traffic related data, analyze the data to detect traffic anomalies, and then modify the data collection and reporting parameters to more accurately characterize the traffic anomaly. The central control system collects this data (harvests) and characterizes the traffic conditions.

Another aspect of the present invention includes directed control of the deployed traffic probes by the central control system. As the central control system receives traffic data reports, the central control system can analyze the data to identify traffic anomalies or points of interest. Once identified, the central control system can identify traffic probes in the vicinity of the traffic anomaly or point of interest and send a control command to one or more of the traffic probes thereby instructing the traffic probes to gather additional or different data and to report the data at a different rate (seeding).

In one embodiment of the present invention, multiple autonomously enable traffic probes are deployed, some or all of which also operate under directed control of the central control system. Thus, as the traffic probes identify traffic anomalies, they can modify the type of data collected and the reporting rate to the central control system. The central control system is able to maintain a desired level of accuracy of the traffic characterization by controlling the amount of data, types of data and the reporting frequency of the various traffic probes.

These and other aspects, embodiments and features of the present invention are more fully described in the following description, figures and claims.

DETAILED DESCRIPTION OF THE INVENTION

The present invention, among other things, operates to gather traffic related information from a plurality of deployed probes that autonomously gather traffic data, detect the occurrence of traffic anomalies and gather and report further data to a central control system based at least in part on the traffic anomalies. In addition, the central control system can assume control or send control signals to the deployed probes to modify the data collection and reporting characteristics. Advantageously, the present invention enables not only the detection of traffic anomalies, but also a characterization of the traffic anomalies by identifying braking points, release points, traffic zones, flow speed through a traffic zone, length of a traffic zone and the like.

Turning now to the figures, in which like references identify like elements throughout the several view, embodiments, aspects and features of the present invention are described more fully.

Figure 1:
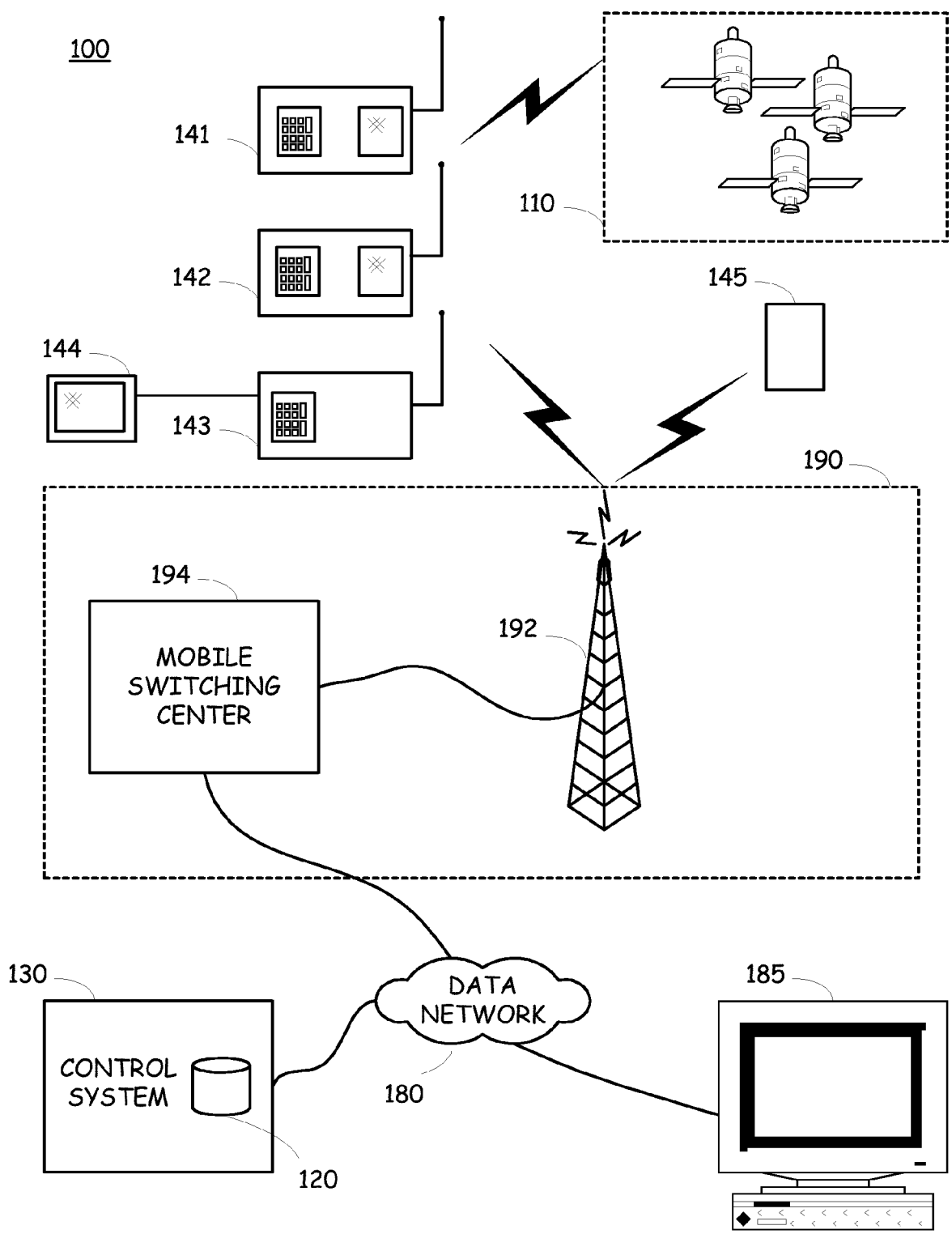
FIG. 1 is a system diagram of the various components and devices of an exemplary system/environment that could be utilized to implement or support embodiments of the present invention.

FIG. 1 is a system diagram of the various components and devices of an exemplary system/environment that could be utilized to implement or support embodiments of the present invention. The system 100 includes various components that are communicatively coupled to each other using various communication techniques. From the present inventions perspective, the key components include a workstation or computer 185 that interfaces to a web-based mapping application embodying the present invention and operating on a control system 130 or that includes the mapping application itself. Also of importance is a receiving device, such as mobile telephone 145 or other mobile units 141-143. In general, the computer 185 provides a user access to the mapping application, whether it is a resident program or a browser accessed web application. In addition, alerting or updated information can be sent to the computer 185 via a user's email account, or could be sent in other manners such as short messages to a mobile telephone, PDA, pager, etc 145 or mobile devices 141-143.

More generally, a geostationary orbiting satellite positioning system 110 operates to provide signals to mobile devices 141, 142 and 143. These satellite signals can be used by the mobile devices to identify the location of the mobile devices. The operation of such a typical geostationary orbiting satellite positioning system is well known to those skilled in the art. The most common satellite system that operates to provide such information is the Global Positioning System or GPS. The GPS is a constellation of twenty-four well-spaced satellites that orbit the Earth at 10,600 miles above sea level. The satellites are spaced at such intervals and altitude that for any given point on the Earth, at least four satellites will be communicatively seeable, or above the horizon. Each satellite in the GPS constellation includes a computer system, an atomic clock, and a transmitter. The satellites continuously transmit a data stream that identifies the current position of the satellite and the current time. Through the detection and decoding of these GPS signals, the mobile units are able to identify the longitudinal and latitudinal coordinates at which the mobile device is located. However, it should be appreciated that the present invention is not limited to operation with the GPS and other location technologies can also be utilized. Thus, when the term GPS is used within the context of this description, it is synonymous with other compatible location determining technologies unless otherwise stated.

The mobile devices 141, 142 and 143 are equipped to receive and/or determine location information, and also to transmit information to a dispatch and control or central system 130 through a communications medium. In the illustrated embodiment, the communications medium is a cellular telephone network utilizing technology such as GSM with GPRS, CDMA, TDMA, or similarly capable technologies. This technology enables the communication of data between the mobile devices and the control system. The cellular based data transmissions from the mobile devices 141, 142 and 143 are received by the mobile system 190 at antenna 192 and are provided to the mobile switching center 194. The mobile switching center then provides the received data transmissions to the control system 130 through a data network 180.

The control system 130 is also functional to transmit data to the mobile devices 141, 142 and 143 through the data network 180 and the cellular system 190. The control system 130 includes a database system 120 that houses, among other things, data utilized for various embodiments of the present invention. The mobile devices 141 and 142 are shown as including a display and a key pad. Such elements can be included in various embodiments of the present invention in addressing various aspects and functions of the invention and allow a user of the mobile device to review information received from the GPS transmitters and the control system, and to enter additional information to be provided back to the control system 130. However, it will be appreciated that other embodiments may not require such elements. The mobile device 143 is shown as interfacing to an external display device or an external device 144 that includes a display, such as a navigational system. In this embodiment, the control system can provide data to the external device 144 through the mobile device 143, or in other embodiments may directly provide data to the external device 144. Although not illustrated, it should be appreciated that the mobile devices may also interface to other data devices such as scanners, digital cameras, audio devices, analog to digital converters, an automobile data bus, measurement equipment, digital clocks, or other various devices.

The control system 130 includes the database system 120. The database system 120 can contain a variety of information depending on the various embodiments of the present invention. The database system 120 and the control system 130 may also be accessed via computer 185. Such a system allows the information in the database and information regarding the various mobile devices to be accessed from any computer system connected to the control system 130 through the data network 180. It should be appreciated that although FIG. 1 describes an exemplary environment that is suitable for the present invention, the present invention is equally applicable to other environments and is not limited to the illustrated environment. Rather, the illustrated environment has been provided as a non-limiting example of the operation of the present invention.

Figure 2:
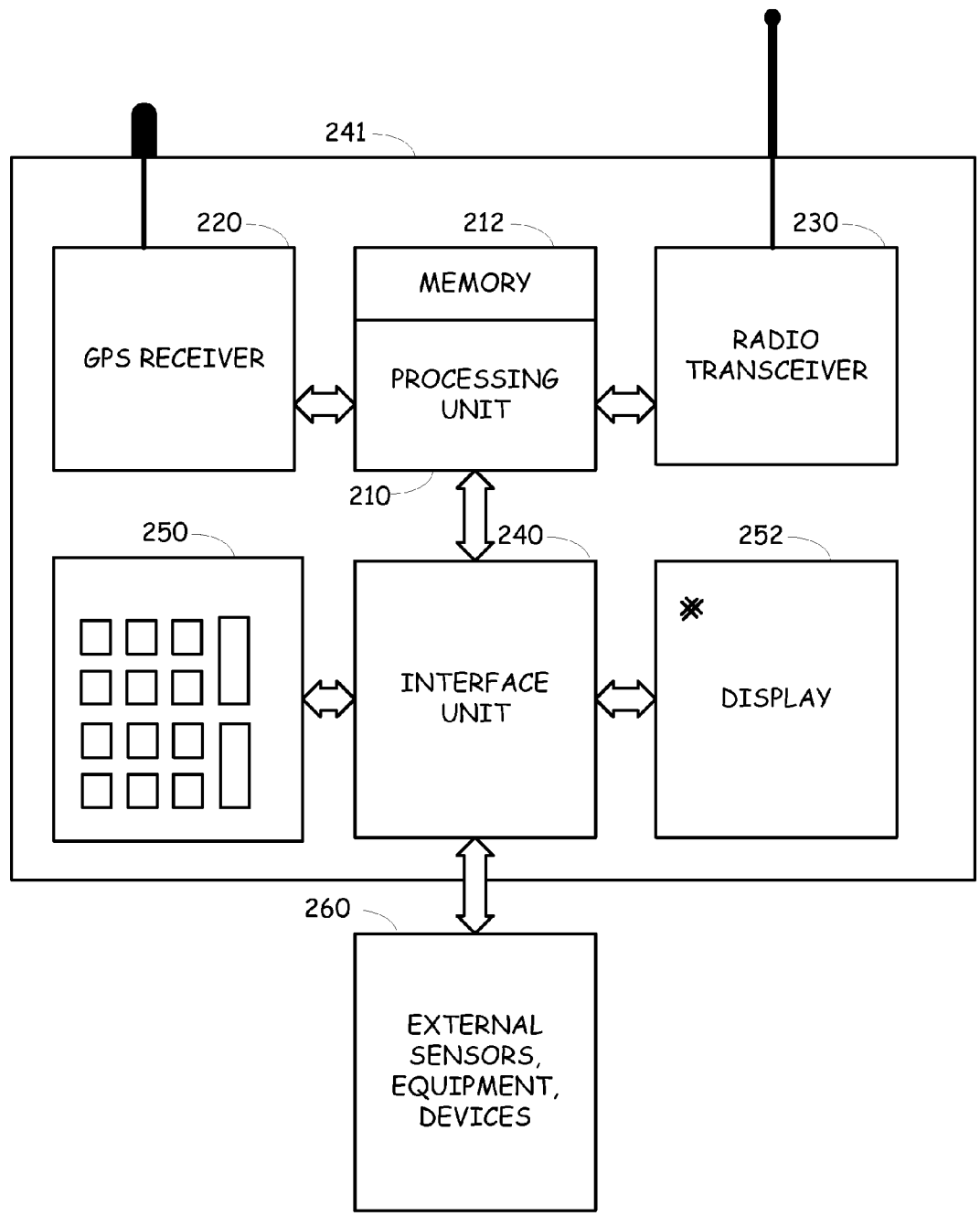
FIG. 2 is a block diagram of an exemplary mobile device that can operate as a traffic data probe and that is suitable for embodiments of the present invention.

FIG. 2 is a block diagram of an exemplary mobile device that can operate as a traffic data probe and that is suitable for embodiments of the present invention. The exemplary mobile device 241 is an all-in-one self-contained box that includes various external connectors. Having all of the functional components within a single box allows for rapid and ease of installation. The mobile device is small and lightweight for easy transportation. The overall operation of the mobile device 241 is controlled by a processing unit 210 that includes memory element 212 for housing the software or firmware for defining the operation of the device, as well as temporary variables and status indicators. The mobile device 241 includes a GPS receiver 220 and a radio transceiver (transmitter and receiver) 230. Under control of the processing unit 210, the GPS receiver 220 can be enabled to detect signals from the GPS satellites and determine the location of the mobile device 241. The location information is then provided to the processing unit 210 for storage in memory 212 or for immediate transmission through radio transceiver 230. The processing unit 210 can interface to various input and/or output devices through an interface unit 240. For instance, the processor can receive key actuations from keypad 250 and display status or other information on display 252. The processing unit 210 can interface to external devices 260, measurement equipment, analog inputs, digital inputs or instrumentation through the interface unit 240 using a variety of wireless and wired technologies. For instance, a measurement device may provide an RF, digital or analog signal to the processing unit for storage, processing or otherwise acting upon. In addition, the processing unit 210 can interface to a vehicle bus through interface unit 240. As those skilled in the art will understand, the vehicle bus can convey a variety of status information regarding the vehicle, such as but not limited to, the vehicle speed, application of brakes, operation of the steering wheel, brake pressure, accelerator pressure, etc.

The processing unit 210 may also receive information through the radio transceiver 230 such as status, data and operational commands. As an example, the mobile device 241 may receive a request from the control system 230 to provide the current location of the mobile device 241. In response to receiving the request through the radio transceiver 330, the processing unit enables the GPS receiver 320 to decode the current location. This information is then transmitted to the control system 130 (see FIG. 1). Similarly, the processing unit 210 may periodically request the GPS receiver 220 to measure the current location of the mobile device 241. When the mobile device 241 enters into a particular area, this status information may be automatically transmitted by the processing unit 210 through the radio transceiver 220. Thus, depending on the various configurations, the location of the mobile device 241 can be continuously monitored, or it can simply report as it moves between or near areas of interest.

As has been described, the general scope of the present invention is the interaction of a control system with various mobile devices operating within a system. One aspect of the present invention is the various mechanisms or triggers that invoke such interaction. In general, there are two types of systems or methods for devices to talk to each other. These general methods include: (a) polling or (b) interrupt driven. In a polled environment, a master or controller periodically or a' periodically communicates with another device, such as a slave device, to ensure the device is still active, to determine if the device needs any input or actions to be taken, or simply to provide information to or extract information from the device. In an interrupt driven system, devices autonomously communicate back to a master or central system either based on a schedule or the occurrence of an event. There are advantages and disadvantages to both techniques and the bottom-line deciding factor typically turns on the particular application or usage. In the present invention, a central system, the control system, is contacted by multiple mobile devices in an autonomous manner—interrupt driven. However, it should be understood that embodiments of the invention may also utilize polled communication initiated by the control system.

Having described a suitable system and mobile device that could serve as the basis for an embodiment of the present invention, it will be appreciated that one aspect of the present invention is a system that operates to gather and report traffic related information. Each of the mobile devices 241 may include an autonomous process that operates to collect certain traffic related information and then to report this traffic related information to the central control system at a particular reporting rate.

The traffic related information can include a variety of information. Non-limiting examples of the traffic related information include the absolute location of the mobile device, the relative location of the mobile device, the speed of the mobile device, the average speed of the mobile device, and the characteristics of movement of the mobile device (i.e., consistent high-speed, consistent slow speed, vacillating speeds, stop and go, etc). The autonomous operation of the mobile device enables the mobile device to collect specific traffic related data and to transmit the collected data to the central control system at a specific rate either in a constant manner, or based on the analysis of the collected traffic data.

Figure 3:
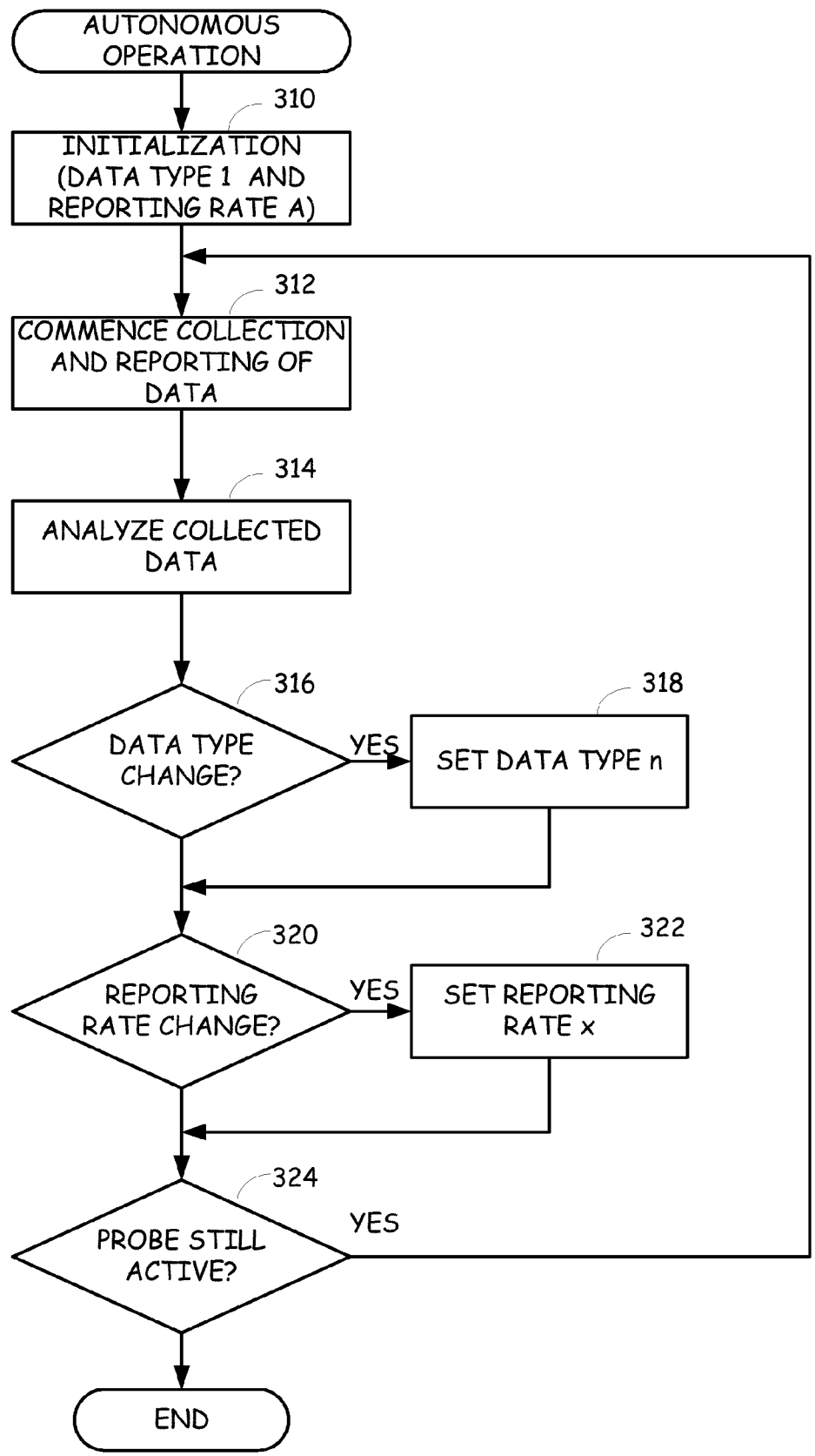
FIG. 3 is a flow diagram illustrating the steps involved in an exemplary autonomous operation of a mobile device.

FIG. 3 is a flow diagram illustrating the steps involved in an exemplary autonomous operation of a mobile device. The autonomous process 300 commences at step 310 upon enabling the mobile device or traffic probe to begin operation. This may include powering on the traffic probe, enabling the traffic probe, upon the traffic probe receiving a signal from the central control system or upon the traffic probe detecting the occurrence of an event (i.e., entering into a zone or region or receiving a signal from an external measurement device). In the initialization process, the traffic probe defaults or initializes to a data type and a reporting rate. The data type and reporting rate can be configured by the user, configured as a default upon manufacture, installation or provisioning of the traffic probe, or established by the central control system. Furthermore, the traffic probe defaults can be set depending on the type of vehicle in which the traffic probe is installed, the typical travel patterns of the vehicle, the locale of the vehicle, etc. The data type identifies the data to be collected by the traffic probe as well as the content and format of the data reported to the central control system. It should be appreciated that the data to be collected and the content and format of the data to be reported can be independently adjusted in various embodiments of the present invention, or may simply be tied together. The data type can also define the frequency at which the traffic probe operates to collect traffic data from various sources. The reporting rate defines the frequency at which the traffic data is transmitted to the central control system.

Once the traffic probe is initialized, it begins collecting traffic data from the various sources (i.e., GPS receiver and/or external devices) and reporting the traffic data to the central control system 312. In conjunction with the collection and reporting process, the traffic probe may also operate to autonomously analyze the collected data 314. In an exemplary embodiment of the present invention, a goal of the overall operation is to identify real-time traffic conditions and to identify and characterize traffic anomalies. An anomaly can be any of a variety of conditions, including but not limited to, slow traffic conditions, fast traffic conditions, fluctuating traffic conditions or the like. Thus, one aspect of the analysis process may include examination of the last X number of data readings to detect a change in traffic behavior. For instance, if the speed of the vehicle is consistently being measured at one speed, and then rapidly changes to another speed for a period of time, this can be considered a traffic anomaly. As a more specific and non-limiting example, the collected data may indicate that the vehicle is moving at a speed of 55 to 65 MPH for a prolonged period of time, followed by the detection that the speed has dropped to 5 to 7 MPH. If the traffic probe detects this slower speed range is persistent, it may determine that the vehicle is in heavy traffic. Alternatively, the traffic probe may delay such a determination to ensure that the vehicle is not sitting at a traffic light or stop sign. Likewise, the traffic probe can operate to determine when a vehicle is exiting traffic congestion by detecting a sudden increase in vehicle speed.

Those skilled in the art will appreciate that several heuristics may be applied in drawing conclusions from particular status measurements. For instance, if the traffic probe detects that the brake pedal is being pressed frequently and the speed of the vehicle is low, the analysis may conclude that the vehicle is in heavy traffic. However, if the brake pedal is not being pressed frequently but the vehicle speed is still low, the analysis may simply conclude that the speed limit has changed, such as is the case when a vehicle enters a school zone or residential area.

Once a traffic change or anomaly is detected, the traffic probe may autonomously modify its operation by either changing the type of data collected and/or the rate at which the collected data is reported. If the traffic probe determines that a data type change is warranted 316, the data type setting is changed (type n) 318. The number of data types available can vary from embodiment to embodiment and it will also be appreciated, that although the ability to change data types in and of itself may be considered novel, other embodiments of the present invention may only utilize a single data type for autonomous operation. If the traffic probe determines that a change in the reporting rate is warranted 320, then the data rate setting is changed to (rate x) 322. If the traffic probe is still active 324, then processing returns to step 312 where further data is collected and reported. Otherwise, processing ends.

Figure 4:
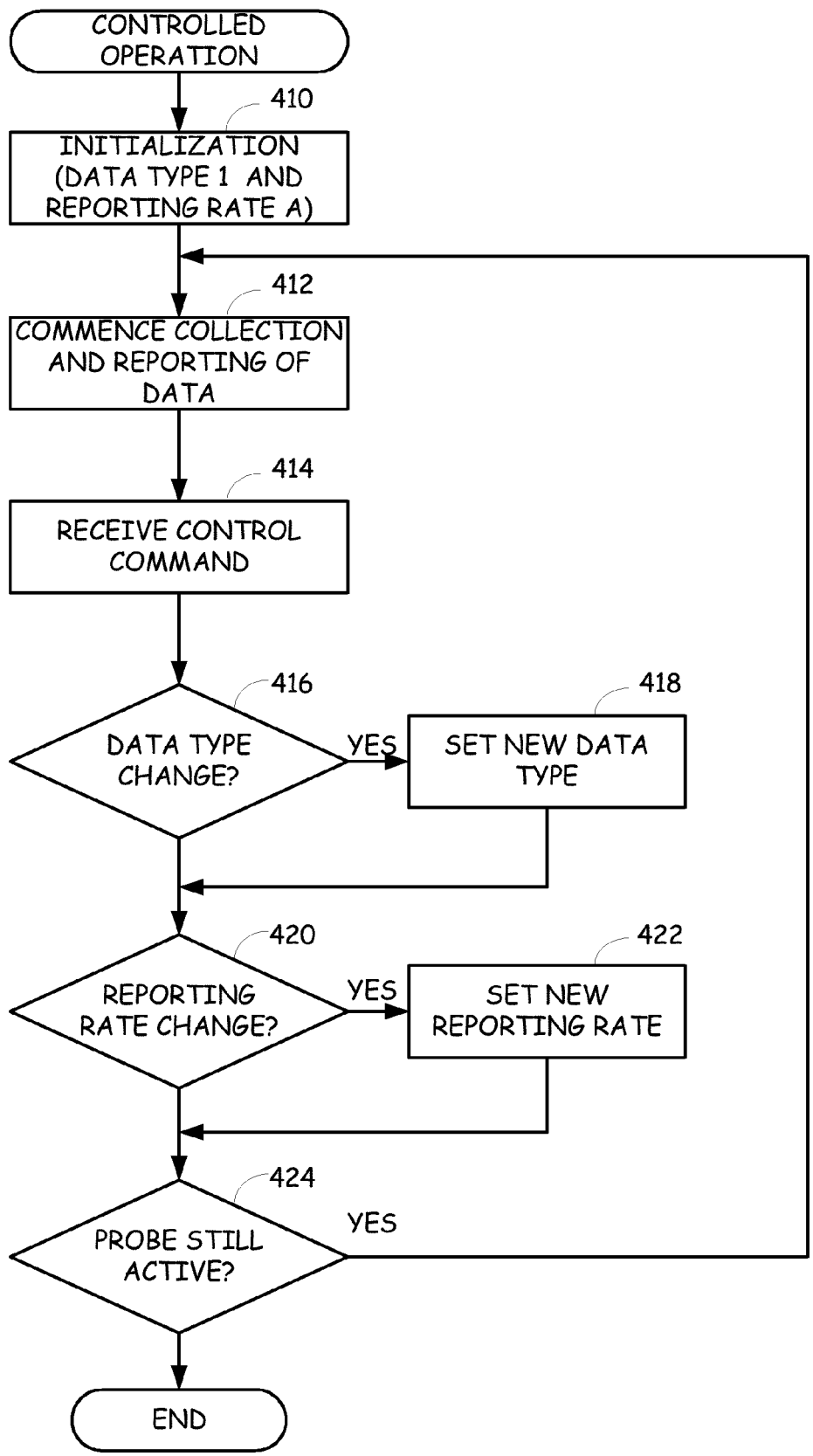
FIG. 4 is a flow diagram illustrating the steps involved in an exemplary controlled operation of a mobile device.

FIG. 4 is a flow diagram illustrating the steps involved in an exemplary controlled operation of a mobile device. The controlled process 400 commences at step 410 upon enabling the mobile device or traffic probe to begin operation, similar to step 310 in FIG. 3 and the description of the operation for step 310 also applies to step 410.

Once the traffic probe is initialized, it begins collecting traffic data from the various sources (i.e., GPS receiver and/or external devices) and reporting the traffic data to the central control system 412. During operation, the traffic probe may receive a control command from the central control system 414. In an exemplary embodiment, the control command is used to reconfigure the operation of the traffic probe based on various circumstances. As previously describe, an advantage of the present invention is to detect traffic anomalies and then gather a heightened amount of information to further characterize the traffic anomaly. Thus, similar to the autonomous operation, the decision for the central processing unit to send the control command to a traffic probe can be based on a variety of circumstances. In fact, the control command may be sent to a traffic probe completely independent of the detection or suspicion of a traffic anomaly, but rather, simply because the central control system desires more data points.

However, in an exemplary embodiment, as traffic data is reported to the central control system, the central control system can analyze the traffic data in search for anomalies. If a traffic change or anomaly is detected, the central control system may send a control command to the traffic probe forcing the traffic probe to modify its operation. For instance, the control command may request the traffic probe to either change the type of data collected and/or the rate at which the collected data is reported. If the control command requests a data type change 416, the data type setting is changed (new type) 418. The number of data types available can vary from embodiment to embodiment and it will also be appreciated, that although the ability to change data types in and of itself may be considered novel, other embodiments of the present invention may only utilize a single data type for autonomous operation. If the control command requests a change in the reporting rate 420, then the data rate setting is changed (new rate) 422. If the traffic probe is still active 424, then processing returns to step 412 where further data is collected and reported. Otherwise, processing ends.

Although the autonomous operation and the controlled operation has been described as separate modes of operation, it will be appreciated that a traffic probe may operate in accordance with both modes. The controlling mode of operation can vary from embodiment to embodiment. For instance, in a traffic probe centric embodiment, the autonomous mode of operation may be prevalent. Thus, in such an embodiment, if the traffic probe is reporting data in a default manner, then control commands from the central control system may be accepted. However, if the traffic probe is operating in a manner enabled due to the detection of an anomaly, then the control from the central control system may be disabled. In a central control system centric embodiment, the autonomous operation of the traffic probe can be overridden at any time upon the reception of a control command.

Thus, in an exemplary embodiment of the present invention, a central control system may operate with multiple traffic probes that are deployed in a region, such as a state, city, county or simply an area of interest. In cooperation, the central control system and the traffic probes gather traffic related information, analyze the traffic related information and ultimately can provide it to a system similar to that described in the above-referenced related application. Each of the traffic probes is functional to communicate with the central control system. The general operation of the traffic probes is to gather traffic data and report the data to the central processing unit. Some of the traffic probes operate in an autonomous mode whereas some of the traffic probes may be completely controlled by the central control system.

As traffic data is collected and analyzed, the individual probes may autonomously identify traffic anomalies and then begin collecting and reporting heightened information regarding that traffic anomaly (i.e., gather additional data and/or transmit data more frequently to the central control system). Part of the data reports from the traffic probes enable the central control system to be aware of the location of the various traffic probes. Thus, when a traffic probe reports an anomaly at a certain location, the central control system may identify other traffic probes within that area and then force those probes to collect and report heightened information.

Figure 5:
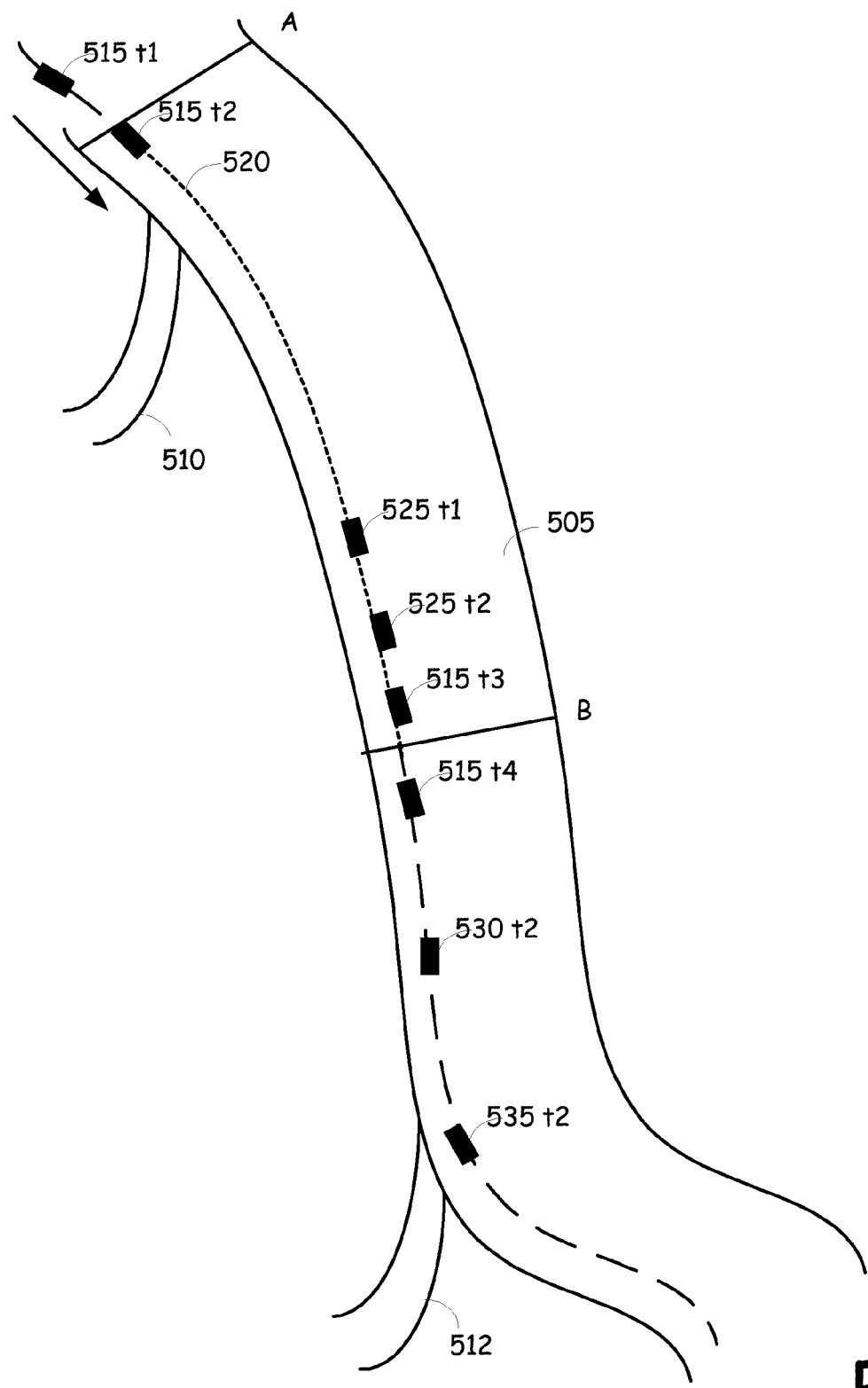
FIG. 5 is a conceptual diagram of an example use of an embodiment of the present invention to gather data about a traffic jam.

FIG. 5 is a conceptual diagram of an example use of an embodiment of the present invention to gather data about a traffic jam. In the illustrated example, a traffic probe 515 is traveling in a vehicle along path 520 on road 505. At time t1, the traffic probe 515 is traveling at a normal speed but is approaching point A which is the beginning of a traffic jam that has a release point at point B. At time t1, traffic probe 515 is reporting traffic data in a normal manner as illustrated by a long dashed line. However, at time t1 traffic probe 525 is in the midst of the traffic jam may be reporting heightened data to the central control system as illustrated by a short dashed line. As traffic probe 515 cross point A, it detects a significant decrease in travel speed and autonomously begins reporting traffic data at a higher frequency. At this time, the central control system has two traffic probes in the same vicinity that are reporting slow moving traffic at a heightened rate. Thus, the central control system can conclude that a traffic jam seems to exist at least between the location of traffic probe 515 at time t2 and the traffic probe 525 at time t2.

The central control system may then operate to identify other traffic probes that are within the vicinity. In the illustrated example, traffic probes 530 and 535 are shown at their time t2 positions. The central control system can send a control command to force the traffic probes 530 and 535 to begin reporting data more frequently or, may simply analyze the recent data reports from these probes and conclude that they have exited the traffic jam. Thus, at time t2, the central control system can conclude that the beginning of a traffic jam is located at point A, that the traffic jam extends at least to the location of traffic probe 525 and that the release point is somewhere between traffic probe 525 and 530. If traffic probe 525 is not reporting traffic data in a heightened mode, the central control system may send a control command to force a higher rate of reporting. Likewise, if the traffic probe 525 is reporting traffic in a heightened mode, the central processing unit may still increase or change the reporting rate and/or the data being reported. As traffic probe 525 passes over point B and its speed increases, the central control system will determine the breaking point of the traffic jam. Likewise, as traffic probe 515 continues on the path 520 through time t3 and time t4, the central control system will get another detection of the breaking point B (which may have changed since traffic probe 525 passed through).

Another aspect of the present invention is the ability for seeding a segment. Seeding a segment generally refers to forcing deployed traffic probes in a particular segment (such as a latitude longitude coordinate) to increase the reporting rate of traffic data and/or increase the amount of data being reported (i.e., braking data, accelerometer data, views from externally mounted cameras, noise, speed, etc.). Advantageously, this aspect of the present invention improves the data collection for areas in which only a limited or a few number of probes are deployed. Thus, in an area that has a high number of deployed probes, the central control system may simply harvest the information being received from the traffic probes and thereby obtain an accurate depiction of the traffic status. To obtain similar results in an area with only a few traffic probes, the central control system may need to seed the traffic probes to increase the amount of traffic data available for analysis.

Another aspect of the present invention is the implementation of a coefficient of optimal accuracy. For instance, to obtain an accuracy of X %, a certain amount of data in a particular segment is required. For instance, Z traffic probes moving in the same direction may be required to obtain an accuracy of X %. In segments where only Z-Y traffic probes are deployed, the coefficient for optimal accuracy is too low. Advantageously, the present invention can increase the reporting rate of the Z-Y probes to increase the coefficient of optimal accuracy. As an example, suppose that a coefficient of optimal accuracy of 95% is desired and to achieve this, 20 traffic probes moving the same direction are required. If only 10 traffic probes are available reporting at a rate R, then the 10 probes can be seeded to report twice as often at a rate of R*2 thus giving the same amount of data that would be available if 20 traffic probes were deployed.

Although for illustrative purposes, the present invention is described within particular embodiments or applications, it should be appreciated that the present invention is not limited by these examples or applications. Rather, the present invention and aspects of the present invention can be incorporated into a variety of embodiments and applications without departing from the spirit and scope of the present invention.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or aspects or possible combinations of the features or aspects. Variations of embodiments of the present invention that are described and embodiments of the present invention comprising different combinations of features noted in the described embodiments will occur to persons of skilled in the art. The present invention may be implemented by any one of, or any combination of, software, hardware, and/or firmware. In the description and claims, each of the verbs, "comprise" "include" and "have", and conjugates thereof, are used to indicate that the object or objects of the verb are not necessarily a complete listing of members, components, elements or parts of the subject or subjects of the verb.

What is claimed is:

1. A system for gathering traffic related information, the system comprising:
    a geographically stationary central control system operable to communicate directly with at least one of a plurality of traffic probes, wherein said at least one of a plurality of traffic probes resides in a mobile vehicle and comprises a sensor;
    at least one mobile vehicle including at least one traffic probe, wherein the at least one traffic probe is communicatively coupled to the central control system;
    an autonomous process operating within the at least one traffic probe and being operable to:
        control the rate and type of data collection;
        record collected data, wherein the collected data is uniquely attributable to the traffic probe and sufficient to support a derivation of traffic related data;
        derive traffic related data; and
        transmit the traffic related data to a central processor; and
    a control process operating within the central control system and being operable to receive the traffic related data from the at least one traffic probe, analyze the received traffic data and override the autonomous process operating within select at least one traffic probes based at least in part on the analysis.

2. The system of claim 1, wherein the autonomous process further comprises:
    a first mode that transmits the traffic data at a first rate; and
    a second mode that transmits the traffic data at a second rate.

3. The system of claim 1, wherein the autonomous process further comprises:
    a first mode that gathers a first set of collected data and transmits the first set of traffic data at a first rate; and
    a second mode that gathers a second set of collected data and transmits the second set of collected data at a second rate.

4. The system of claim 1, wherein the control process is operable to override the autonomous process by sending a command to a particular traffic probe thereby forcing the particular traffic probe to collect data and report the derived traffic data in accordance with particular parameters.

5. The system of claim 1, wherein the traffic probe comprises a global positioning system receiver.

6. The system of claim 1, wherein the traffic probe is installed in a vehicle that includes a bus providing vehicle status information, and the traffic probe comprises an interface to bus for receiving the vehicle status information.

7. The system of claim 6, wherein the vehicle status information on the bus includes the vehicle speed.

8. The system of claim 6, wherein the traffic probe includes a cellular based transceiver communicating with the central control system.

9. A method for gathering traffic data for analyzing fluctuating traffic conditions in a real-time manner, the method comprising the steps of:
   collecting data autonomously using at least one in-traffic probe, wherein said in-traffic probe resides in a mobile vehicle and comprises a sensor, and wherein the collected data is uniquely attributable to the traffic probe and sufficient to support a derivation of traffic related data;
   deriving traffic related data;
   reporting the derived traffic data at a first rate to a central control system;
   detecting a change in traffic data that satisfies a threshold level, wherein the detection is made by said in-traffic probe;
   in response to detecting the change in traffic data, commencing to report the traffic data at a second rate to the central control system;
   receiving a signal from the central control system at the in-traffic probe and in response to the signal, reporting the traffic data at a third rate to the central control system.

10. The method of claim 9, further comprising the step of, in response to detecting the change in traffic data, modifying the collection of data.

11. The method of claim 9, wherein the traffic data is derived from a collected travel speed of the in-traffic probe and the threshold level includes a speed value, and the step of detecting a change in traffic data that satisfies the threshold level further comprises detecting that the travel speed identified by the traffic data is less than the threshold level.

12. The method of claim 9, wherein the traffic data is derived from a collected travel speed of the in-traffic probe and the threshold level includes a speed value, and the step of detecting a change in traffic data that satisfies the threshold level further comprises detecting that the travel speed identified by the traffic data is greater than the threshold level.

13. The method of claim 9, further comprising the step of, in response to receiving the signal from the central control system, modifying the collection of data.

14. The method of claim 9, wherein the data is collected periodically based on time and the data includes location information, and the step of detecting a change in derived traffic data that satisfies a threshold level comprises the steps of:
   examining the location information for the last X collections of data; and
   if the distance traveled over the last X collections is less than a threshold distance, concluding that the change in traffic data is collected.

15. The method of claim 14, wherein the step of commencing to report the traffic data at a second rate to the central control system in response to detecting the change in traffic data further comprises:
   increasing the rate at which data is collected; and
   reporting the traffic data at the second rate which has a higher frequency than the first rate.

16. The method of claim 9, further comprising the steps of:
   receiving the report of the derived traffic data from the in-traffic probe at the central control system;
   the step of detecting a change in traffic data that satisfies a threshold level is performed by the central control system based at least in part on the report of derived traffic data from the in-traffic probe;
   in response to detecting the change in traffic data, transmitting a signal to one or more in-traffic probes to modify the operation of data collection and reporting of the one or more in-traffic probes.

17. The method of claim 9, further comprising the steps of:
   receiving the report of the derived traffic data from the in-traffic probe at the central control system;
   in response to the contents of the traffic data, transmitting a signal to one or more in-traffic probes to modify the operation of data collection and reporting of the one or more in-traffic probes.

18. A method for gathering traffic data, the method comprising the steps of:
   collecting data autonomously at a first in-traffic probe operating in proximity to a first zone, wherein said in-traffic probe resides in a mobile vehicle, comprises a sensor and is configured to run an autonomous process comprising the steps of:
      controlling the rate and type of data collection;
      recording collected data, wherein the collected data is uniquely attributable to the traffic probe and sufficient to support a derivation of traffic related data; and
      deriving traffic related data; and
      transmitting the traffic related data to a central processor;
   the first in-traffic probe reporting the traffic data at a first rate to a geographically stationary central control system;
   the central control system receiving traffic data reports from a plurality of in-traffic probes;
   the central control system sending a control signal to the first in-traffic probe;
   in response to reception of the control signal, the first in-traffic probe commencing the reporting of the traffic data at a second rate.

19. The method of claim 18, further comprising the step of the central control system sending a second control signal to one or more additional in-traffic probes of the plurality of in-traffic probes that are also operating in proximity to the first zone.

20. The method of claim 18, further comprising the steps of:
   the central control system analyzing the traffic data reported by the first in-traffic probe at the second data rate to determine when the first in-traffic probe exits the first zone; and
   sending a second control signal to the first in-traffic probe; and
   in response to the reception of the second control signal, the first in-traffic probe commencing the reporting of the traffic data at the first rate.

* * * * *